United States Patent [19]
Barber

[11] 3,738,821
[45] June 12, 1973

[54] PROCESS OF AGGLOMERATING AMMONIUM SULFATE AND MAKING COMPLETE FERTILIZER

[75] Inventor: Mack A. Barber, Hanford, Calif.
[73] Assignee: Reserve Oil and Gas Company, Los Angeles, Calif.
[22] Filed: May 18, 1972
[21] Appl. No.: 254,505

Related U.S. Application Data
[63] Continuation-in-part of Ser. Nos. 52,754, July 6, 1970, abandoned, and Ser. No. 102,145, Dec. 28, 1970, abandoned.

[52] U.S. Cl. .................. 71/36, 23/313, 71/61, 71/64 DB, 423/544
[51] Int. Cl. ............................................. C05b 7/00
[58] Field of Search ............... 71/36, 64 DB, 61; 23/313; 423/544–550

[56] References Cited
UNITED STATES PATENTS
3,475,132 10/1969 Seifert et al. ............... 71/64 DB X
2,600,253 6/1952 Lutz ........................... 71/64 DB X
2,586,818 2/1952 Hains ......................... 71/64 DB X Primary Examiner—Reuben Friedman
Assistant Examiner—Richard Barnes
Attorney—Jas. M. Naylor, Frank A. Neal, John K. Uilkema

[57] ABSTRACT

A method of agglomerating or pelletizing ammonium sulfate for fertilizer and other purposes which includes the addition of a minor amount of ammonium phosphate or equivalent to an aqueous solution of ammonium sulfate and driving off the water to form pellet-sized agglomerates. An aqueous solution of varying quantities of mono-ammonium phosphate, di-ammonium phosphate and ammonium sulfate, the mono- and di-ammonium phosphate portions being the reaction products of wet-process phosphoric acid and either anhydrons or aqua ammonia, is fed to a fluidized bed dryer-pelletizer through a drilled pipe distributor which is within or above the fluidized bed of pelleting fertilizer, said solution forming a series of coatings on the seed pellets in the fluidized bed to thus appreciably increase their size.

7 Claims, 1 Drawing Figure

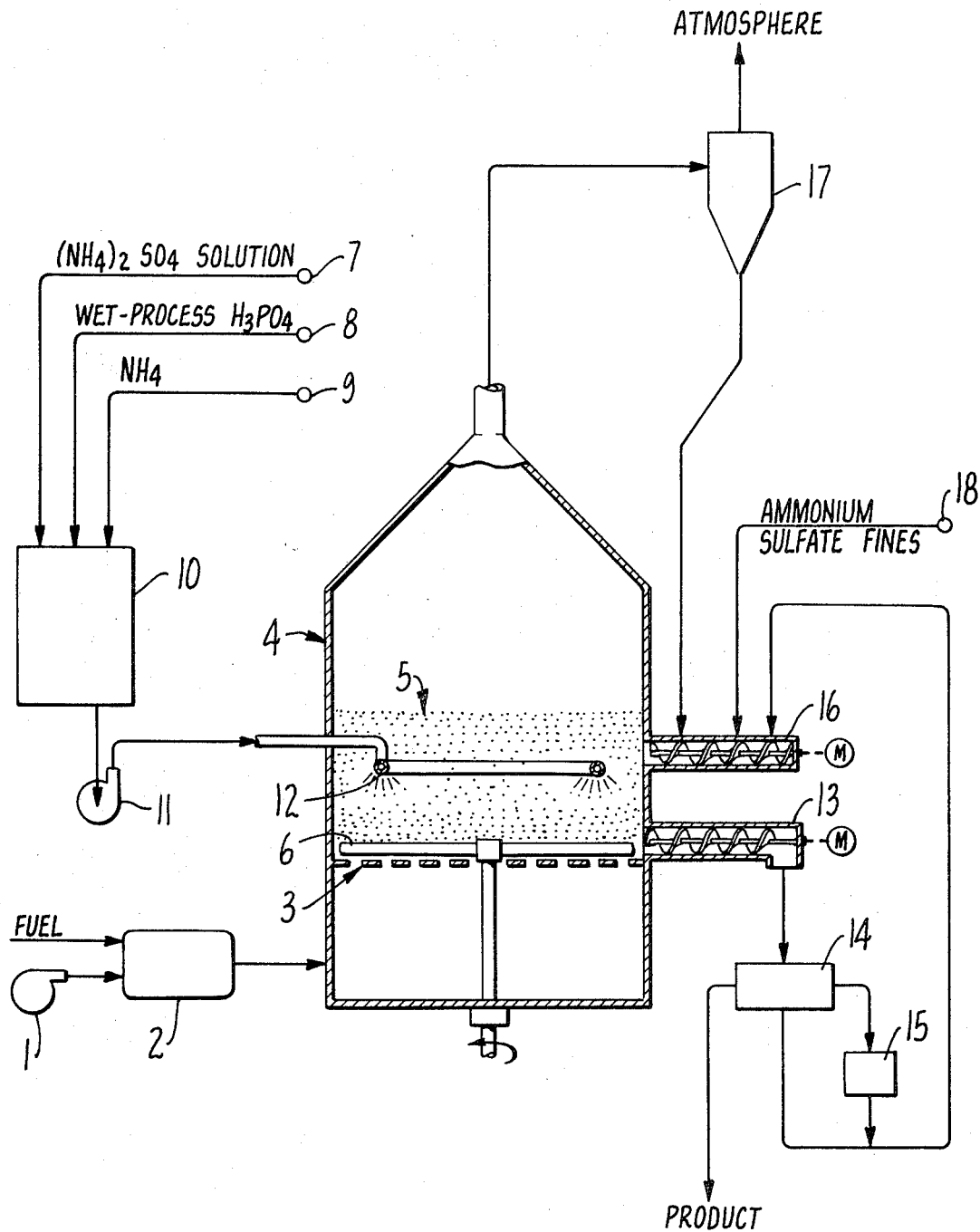

PROCESS OF AGGLOMERATING AMMONIUM SULFATE AND MAKING COMPLETE FERTILIZER

This application is a continuation-in-part of each of my co-pending applications, Ser. No. 52, 754, filed July 6, 1970, for "Ammonium Sulfate Agglomerating Process", and Ser. No. 102,145, filed Dec. 28, 1970, for "Process Of Manufacture Of Complete Fertilizer" both now abandoned.

This invention relates to the manufacture of fertilizer materials and more particularly to a method of agglomerating or pelletizing ammonium sulfate, either alone or with other materials, for fertilizer and other purposes which includes the addition of a minor amount of ammonium phosphate or equivalent to an aqueous solution of ammonium sulfate and driving off the water to form pellet-sized agglomerates.

By way of background of the invention, ammonium sulfate in very fine particle form is produced as a by-product of steel plants. In this fine particle form, ammonium sulfate has been used as a low grade fertilizer material. As such, it is not evenly distributable in the field, readily cakes, and has low compatibility with other fertilizers. The essential object of the present invention is to produce a pellet-sized form of ammonium sulfate which will not have these disadvantages of the fine particle form of the material and which will constitute a high grade fertilizer.

One embodiment of the invention has been practiced as follows: To about a 40 percent solution of ammonium sulfate in water there is added a minor amount of phosphoric acid, followed by drying of the resultant solution in a fluid bed unit. More specifically, the ammonium sulfate solution was obtained through the Merseberg Process which involves reacting gypsum and ammonium carbonate to obtain a solution of ammonium sulfate and a precipitate of calcium carbonate. The calcium carbonate is filtered out to about a 5 percent level. To the resulting mixture comprising essentially a 40 percent ammonium sulfate solution there is added from about 0.5 percent to not above about 1.6 percent by weight of $P_2O_5$. The higher level of the $P_2O_5$ is dictated by the fact that over 4 percent of $P_2O_5$ in the final dry product disqualifies the product from being described as a commercial grade ammonium sulfate fertilizer. 1 percent of $P_2O_5$ in the 40 percent solution of ammonium sulfate becomes 2.5 percent of $P_2O_5$ in the final dry product.

There is free ammonia in the ammonium sulfate made by the Merseberg Process, and the phosphoric acid reacts with the free ammonia to form some mono-ammonium phosphate and some di-ammonium phosphate. The pH after the addition of the acid is from about 5.5 to about 7.5. In the absence of free ammonia in the ammonium sulfate, ammonia and phosphoric acid or ammonium phosphate, could be added to the ammonium sulfate.

The fluid bed apparatus suitable for practicing the method of pelletizing ammonium sulfate according to the present invention is shown in the accompanying drawing.

Referring to the drawing, the fluid bed apparatus and operating data comprise the following. Air is supplied by blower 1 at the required pressure to the air heater 2, where it is heated by burning fuel, to a temperature substantially above the decomposition point of ammonium sulfate. The hot air and products of combustion pass through a conduit to the lower portion of the cylindrical vessel 4 and thence upward through a gas distribution plate 3 of about 14 feet in diameter and having about 6,000 one-half inch holes, the plate being flat and the holes being substantially evenly spaced. The orifice valocity of air at the plate is about 215 feet per second and the temperature of the air at the plate is substantially above the decomposition temperature of ammonium sulfate. The air velocity within the bed, as though no bed were present, is about 12 feet per second, which velocity is sufficient to fluidize the bed of ammonium sulfate pellets above the distribution plate. The depth of the bed is varied by increasing or decreasing the product withdrawal rate through the product screw 13, with the bed having a static depth of from about 18 to about 36 inches and having a dynamic or fluidized depth of from about 27 to about 54 inches. The air is cooled while passing through the bed by the absorption of heat due to water being evaporated from the pellets. The temperature of the air immediately above the distribution plate and the temperature of the distribution plate is appreciably above the decomposition temperature of ammonium sulfate. Decomposition of the stagnant layer of ammonium sulfate pellets, which rest on the distribution plate 3 between the one-half inch holes therein, is prevented by the action of the slowly turning scraper blade arrangement 6, which is mounted concentrically to the gas distribution plate in close to wiping relation therewith and which agitates the stagnant layer of pellets, causing a portion of said pellets to be thrown into the cooler upper regions of the fluidized bed by the high velocity gas streams passing through the holes in the distribution plate 3 and allowing replacement of said pellets with cooler pellets from the region of the fluid bed substantially above the distribution plate.

The feed solution to the fluid bed is prepared in a reactor tank 10 by mixing the 40 percent solution 7 of ammonium sulfate in water, containing some free ammonia, with a stream of wet-process phosphoric acid 8, said stream of wet-process phosphoric acid being sufficient to add from about 0.5 percent to not above 1.6 percent by weight of $P_2O_5$ to the total solution, and adjusting the pH of said solution to between about 5.5 to 7.5 by the addition of ammonia 9. Alternately ammonium phosphate could be used to provide from about 0.5 percent to not above 1.6 percent $P_2O_5$ in the total solution provided said ammonium phosphate was manufactured from wet-process phosphoric acid.

The feed solution is pumped by the solution pump 11 to the solution feed pipe 12. Said solution feed pipe consists of a drilled pipe of 1½ inch diameter having liquid outlet openings in the form of 60° outwardly flaring fan-shaped, or frusto-cone shaped, openings located at 20° below the horizontal diametral plane of the pipe, the pipe being located from about 12 to about 32 inches above the gas distribution plate, being centrally located with respect thereto, and defining a circle of 8½ feet in diameter, and with the feed solution issuing from the openings in the feed pipe at a velocity of about 10 feet per second.

The streams of feed solution issuing from the feed pipe impinge upon the pellets within the fluidized bed, thus forming a layer of solution on said pellets. Considering again the air, at a temperature substantially above the decomposition temperature of ammonium sulfate, passing upwardly through the holes in the distribution plate 3, said air fluidizes the pellets of ammonium sulfate in the bed and supplies sufficient heat to vaporize the water in the layer of feed solution formed on the pellets by the impingement of the streams of feed solution issuing from the feed pipe holes. The removal of heat from the air by the vaporization of the water in the layers of feed solution causes the temperature of the air to decrease, said decrease being very rapid as the air progresses upwardly through the fluidized bed. The temperature to which the air falls is determined by the quantity of air passing upwardly through the fluidized bed, the temperature of said air as it passes through the holes in the distribution plate, and the quantity of water fed into the fluidized bed through the solution feed pipe. Said temperature to which the air falls is controlled by these factors from about 180°F to about 240°F to cause the moisture content of the product ammonium sulfate pellets to decrease to below 0.4 percent, the level at which caking thereafter occurs.

Ammonium sulfate pellets are withdrawn from the fluidized bed by varying the rotational speed of the product screw conveyor 13. The pellets are screened through screen 14 into a +7 mesh oversize fraction, a −7 +12 mesh product fraction, and a −12 mesh fines fraction, with the product fraction being discharged to storage, the oversize fraction crushed in crusher 15, mixed with the fines, and the mixture returned to the fluid bed unit for further buildup through recycle screw conveyor 16. A portion of the ammonium sulfate feed in the form of small crystals may be introduced through recycle screw conveyor 16.

Cooled air leaving the fluidized bed, having a velocity above the bed in the freeboard area of about 7 feet per second, and carrying a small quantity of ammonium sulfate dust is passed through a conduit to the cyclone 17 where the dust is removed, falls through a conduit to the recycle conveyor 16, and is returned to the fluid bed with the fines and with the crushed oversize. Clean air is exhausted to atmosphere from the cyclone 17.

The invention also relates to the manufacture of complete fertilizers, specifically to those classes of fertilizer commonly known as ammonium phosphate, ammonium phosphate-sulfate and ammonium phosphate-sulfate-potash fertilizer, and more specifically the invention relates to a process whereby these fertilizers are produced in pelletized form. The relative quantities of mono-ammonium phosphate, di-ammonium phosphate, and ammonium sulfate in the aqueous solution, as well as the potassium sulfate, muriate of potash and dry ammonium sulfate fed to the fluidized bed, are determined by the desired percentages of nitrogen, phosphorous and potassium in the first product.

The process may be employed to produce the following fertilizers, for example: 12–12–12, 16–20–0, 19–9–0, 16–8–4, 14–7–14 and 11–48–0. These figures identify, respectively, the percentages of nitrogen, $P_2O_5$ and $K_2O$. A few brief examples of the practice of the process will follow.

In making the 12–12–12 fertilizer, there was mixed together in the mixing tank 10 a 40 percent ammonium sulfate solution, wet-process phosphoric acid, and anhydrous ammonia and water. This resulted in a 50 percent solution which was transferred to the fluidized bed through the drilled distributor pipe 12. Added to the bed, as through conveyor 16, was dry sulfate of potash of about 200 mesh particle size and a dry filler of about 30 to 200 mesh. Any suitable inert material not containing a formula constituent may be used as the filler, e.g., sand, gypsum, limestone. The raw material usage for the end product amounted to about 45 percent of ammonium sulfate, about 25 percent of sulfate of potash, about 10 percent of filler, about 3 percent of ammonia and about 12 percent phosphoric acid.

In making the 16–20–0 fertilizer, there was mixed in the mixing tank 10 a 40 percent ammonium sulfate solution, wet process phosphoric acid, and anhydrous ammonia and water, with the ammonium sulfate solution constituting about 50 percent of the ammonium sulfate requirement in the final product. This mixture was introduced through the drilled distributor pipe 12 into the fluidized bed, and there was also added to the bed, as through conveyor 16, the remaining 50 percent requirement of ammonium sulfate in dry form. The material usage per unit of weight of end product was about 55 percent ammonium sulfate, about 21 percent phosphoric acid, about 6 percent ammonia and about 9 percent filler. That is to say, in producing a to.. of the end product, these percentages of a ton of the raw materials were employed.

What is claimed is:

1. A method of producing a fertilizer material containing ammonium sulfate comprising mixing a major amount of aqueous ammonium sulfate solution with a minor amount of the reaction product of ammonia and wet-process phosphoric acid, and converting the resultant mixture to pellets by forming a fluidized bed of suspended seed particles of ammonium sulfate in a heated stream of air and increasing the size of the seed particles to a predetermined pellet size by spraying the mixture directly into said bed and onto the suspended seed particles and driving off the moisture to form successive layers of material on said particles, said heated stream of air being formed by passing air, at a temperature substantially above the decomposition temperature for ammonium sulfate, upwardly through a distributor plate, and agitating the material on said plate with a rotating scraper to replace it with particles from within the fluidized bed which had been cooled by the aforementioned driving off of moisture.

2. The method of claim 1, said solution containing about 40 percent of ammonium sulfate and said wet-process phosphoric acid constituent of said reaction product amounting to from about 0.5 percent to about 1.6 percent by weight of $P_2O_5$ based upon the weight of said solution.

3. The method of claim 2, said pellets having a water content not in excess of about 0.4 percent by weight and having a size on the order of −7 +12 mesh.

4. A method of producing a pelletized, complete fertilizer comprising mixing ammonium sulfate solution, wet-process phosphoric acid, ammonia and water, converting the mixture to pellets by forming a fluidized bed of suspended seed particles of the mixture in a heated stream of air and increasing the size of the seed particles to a predetermined pellet size by spraying the mixture directly into said bed and onto the suspended seed particles and driving off the moisture to form successive layers of material on said particles, said stream of air, heated to a temperature substantially above the decomposition temperature of ammonium sulfate, being passed upwardly through a distributor plate, and agitating the material on said plate with a rotating scraper to replace it with particles from within the fluidized bed which have been contacted by the air, cooled by said driving off of moisture.

5. The method of claim 4, including adding a filler to said fluidized bed.

6. The method of claim 4, including adding potassium sulfate to said fluidized bed.

7. The method of claim 4, wherein the solute ammonium sulfate constitutes less than the total requirement of ammonium sulfate, and adding dry ammonium sulfate to said fluidized bed up to the total requirement therefor.

* * * * *